United States Patent
Bischoff

(10) Patent No.: US 7,363,122 B2
(45) Date of Patent: Apr. 22, 2008

(54) METHOD FOR CONTROLLING A HYBRID DRIVE OF A VEHICLE

(75) Inventor: Claus Bischoff, Markgiöninger (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/502,668

(22) PCT Filed: Sep. 7, 2002

(86) PCT No.: PCT/DE02/03342

§ 371 (c)(1),
(2), (4) Date: Jan. 5, 2005

(87) PCT Pub. No.: WO03/062004

PCT Pub. Date: Jul. 31, 2003

(65) Prior Publication Data

US 2005/0119805 A1 Jun. 2, 2005

(30) Foreign Application Priority Data

Jan. 24, 2002 (DE) .................. 102 02 531

(51) Int. Cl.
*H02P 9/04* (2006.01)
(52) U.S. Cl. .................. 701/22; 290/36 R; 180/65.3
(58) Field of Classification Search .................. 701/22; 290/36 R, 40; 180/65.3; *H02P 9/04*
See application file for complete search history.

(56) References Cited

U.S. PATENT DOCUMENTS

| | | | |
|---|---|---|---|
| 6,655,484 B2 * | 12/2003 | Levin | 180/65.2 |
| 6,670,788 B2 * | 12/2003 | Prabhu et al. | 320/104 |
| 6,700,212 B2 * | 3/2004 | Ackermann et al. | 290/36 R |
| 6,752,225 B2 * | 6/2004 | Kojima | 180/65.3 |
| 6,838,778 B1 * | 1/2005 | Kandil et al. | 290/31 |
| 7,021,409 B2 * | 4/2006 | Tamor | 180/65.2 |
| 2002/0107618 A1 * | 8/2002 | Deguchi et al. | 701/22 |
| 2003/0038482 A1 * | 2/2003 | Dubus et al. | 290/36 R |
| 2003/0060947 A1 * | 3/2003 | Ertzsaenger et al. | 701/22 |
| 2003/0098187 A1 * | 5/2003 | Phillips et al. | 180/65.3 |
| 2003/0105562 A1 * | 6/2003 | Hsiao et al. | 701/22 |
| 2003/0125850 A1 * | 7/2003 | Evans et al. | 701/22 |

FOREIGN PATENT DOCUMENTS

| | | |
|---|---|---|
| DE | 196 23 847 | 12/1996 |
| EP | 1 160 119 | 12/2001 |
| JP | 9009407 | 1/1997 |
| JP | 9051603 | 2/1997 |
| JP | 2001359202 | 12/2001 |
| WO | 99 46139 | 9/1999 |
| WO | 99/46139 | 9/1999 |

* cited by examiner

Primary Examiner—Tuan C To
(74) Attorney, Agent, or Firm—Kenyon & Kenyon LLP

(57) ABSTRACT

A method for controlling a hybrid drive of a vehicle, the hybrid drive including an internal combustion engine and at least one electric machine as the drive motors, and the output shafts of the drive motors being operatively connectable to a drive train of the vehicle. It is proposed that in response to a negative torque demand on the drive train of the vehicle (braking), the at least one electric machine and the transmission are controlled in generating operating mode based on characteristic maps.

14 Claims, 3 Drawing Sheets

METHOD FOR CONTROLLING A HYBRID DRIVE OF A VEHICLE

FIELD OF THE INVENTION

The present invention relates to a method for controlling a hybrid drive of a vehicle, the hybrid drive including an internal combustion engine and at least one electric machine as the drive motors, and the output shafts of the drive motors being operatively connectable to a drive train of the vehicle.

BACKGROUND INFORMATION

Hybrid drives for vehicles are known. In the hybrid drives discussed here, an internal combustion engine is combined with at least one electric machine so that plural drive sources are available for the vehicle. In this connection, the drive torques of the drive sources can be selectively supplied to a drive train of the vehicle according to a driver's input. This allows different drive options to be selected in known manner as a function of specific driving situations, these options being suitable, in particular, for improving the ride comfort and reducing the energy use, as well as for reducing the emission of pollutants.

In hybrid drives for vehicles, serial arrangements, parallel arrangements and mixed arrangements of an internal combustion engine and electric machines are known. Depending on the arrangement, the electric machines can be connected directly or indirectly to the drive train of the internal combustion engine. It is known to arrange the internal combustion engine and/or the electric machines in such a manner that they can be operatively connected to each other by gears, for example, planetary gear sets or the like, and couplings.

To be able to respond to a driver's request for drive power from the hybrid drive in an optimum way, the drive motors of the hybrid drive need to be controlled in a coordinated manner, which is accomplished by a so-called "motor controller", as is generally known. In the process, the drive motors can be controlled based on a desired operating state of the hybrid drive to be determined by the motor controller. The purpose of the determination of this desired operating state is, in particular, low fuel consumption, dynamic performance of the vehicle, and low pollutant emission.

Moreover, it is generally known to equip vehicles with an electronic control brake system, such as an electrohydraulic brake or an electromechanical brake.

SUMMARY OF THE INVENTION

The method according to the present invention has the advantage that the energy consumption of the vehicle can be reduced by brake energy regeneration. By controlling the at least one electric machine in generating operating mode based on a characteristic map in response to a negative torque request on the drive train of the vehicle, it is advantageously possible to derive, from the desired brake torque, optimized control variables for the at least one electric machine. In this context, the intention for the electric machine working in generator mode is, in particular, to input as much energy as possible into the vehicle electrical system. It is possible, in particular, to pursue an optimum regenerative braking strategy; the control of at least one electric machine based on a characteristic map allowing the implementation of different braking strategies, in particular, purely regenerative braking, simultaneous regenerative and mechanical braking, or purely mechanical braking. In each case, maximum possible brake energy regeneration according to the selected operating modes is possible while accurately applying the desired brake torque. This energy can be supplied to the vehicle electrical system and, possibly, to an automotive battery by the electric machine operating in generator mode so that no additional external energy must be provided in lieu of the recovered braking energy, for example, by the operation of the internal combustion engine. Overall, this contributes to a reduction in fuel consumption, and thus to a reduction in the pollutant emission of the vehicle.

DETAILED DESCRIPTION

Figure 1:
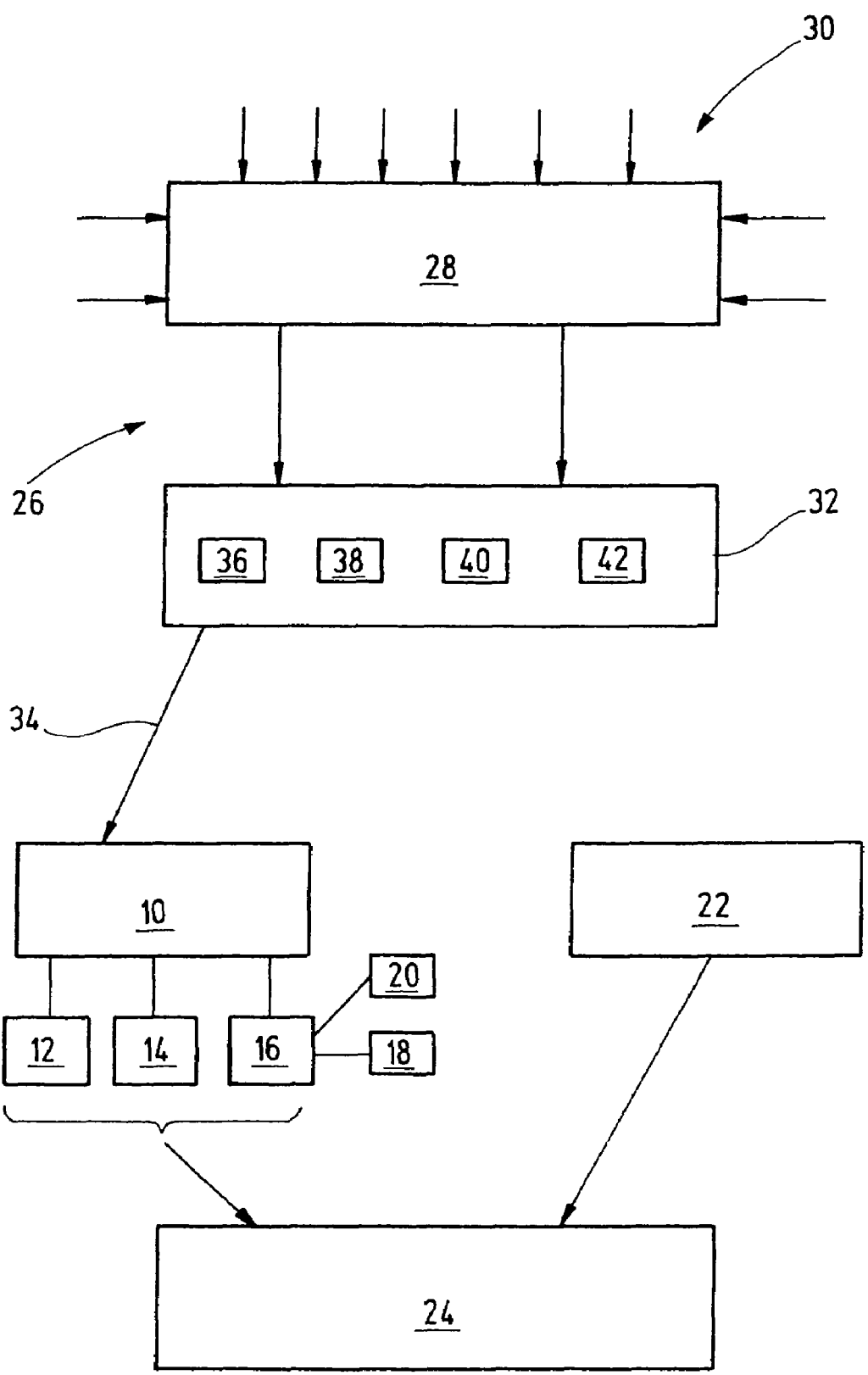
FIG. 1 shows a block diagram of the control of a hybrid drive and brake system of a vehicle.

FIG. 1 schematically shows a drive train and a brake system of a vehicle in a block diagram. The vehicles discussed here contain a hybrid drive 10 including an internal combustion engine 12, a transmission 14, and at least one electric machine 16. Electric machine 16 is connected to a traction battery 18 which is integrated into the vehicle electrical system, and from which the electric machine obtains electric energy while in motor mode and to which the electric machine supplies electric energy while in generator mode. Moreover, electric machine 16 as well as internal combustion engine 12 are integrated into a cooling circuit 20 in which a coolant, such as water, is circulated.

The vehicle further includes an electronic control brake system 22, such as an electrohydraulic or electromechanical brake system. Hybrid drive 10 and brake system 22 act upon a drive system 24, including, in particular, drive shafts, drive axles, vehicle wheels, and the like.

Hybrid drive 10 and brake system 22 are controlled by a control unit 26. The design, arrangement and interaction of control unit 26, hybrid drive 10, brake system 22 and drive system 24 are generally known, and therefore will not be discussed in detail in this specification. In particular, the inventive control of hybrid drive 10 in response to a negative torque request on the drive system 24 will be discussed below. This negative torque can be requested, for example, by actuating a brake pedal or by an automatic driving system. According to this negative torque request, a desired brake torque has to be applied at the wheels of drive system 24.

Control unit 26 contains, inter alia, an interface 28 via which signals 30 can be received from vehicle components. The signals 30 received are, in particular, signals from a higher-level vehicle control system, the motor/generator units of hybrid drive 10, brake system 22, and from drive system 24. Provided as signals 30 are, inter alia, a desired transmission output shaft torque $M_{output}$, the average wheel speed $n_{wheel}$ of the drive axle, an ESP intervention flag $ESP_{Flag}$, an instantaneous battery current $I_{Bat}$, a battery charging enable signal $Bat_{charge}$, an instantaneous generator current $I_{Gen}$, and a coolant temperature $T_{coolant}$ of cooling circuit 20. The desired transmission output shaft torque $M_{output}$ is obtained, for example, by interpreting an accelerator pedal and/or a brake pedal (operated by the driver) or an automatic driving system. The average wheel speed and the ESP intervention flag $ESP_{Flag}$ are provided, for example, by a wheel slip control system. Moreover, interface 28 determines a derivative of the desired transmission output shaft torque $M_{output}/dt$, and, from the average wheel speed $n_{wheel}$, a reference speed v via the speed ratio between the output shaft of hybrid drive 10 and the wheel.

The information corresponding to signals 30 is passed on to a regeneration strategy block 32. Regeneration strategy block 32 provides to hybrid drive 10 a signal 34 which specifies, as control variables, a desired torque $M_{16}$ and a desired speed $n_{16}$ for electric machine 16, as well as a desired speed ratio $i_{14}$ for transmission 14. Of course, there are additional variables which are determined and output for vehicle control, but which will not be discussed in detail in this specification.

Regeneration strategy block 32 includes four function modules, namely a vehicle-specific strategy block 36, a brake module selector 38, a shift logic 40, and a unit control 42.

Regeneration strategy block 32 provides different operating strategies for different states of the motor/generator units of hybrid drive 10 and the overall vehicle. For this purpose, basic operating strategies are provided in brake module selector 38. In this context, a distinction is made between the following basic options:
1. purely regenerative braking of the drive axle; however, the mechanical power for driving electric machine 16 in the generator mode is not sufficient to cover the conversion losses of the electric machine. Although electric machine 16 operates in generator mode, it has to be additionally supplied with electric power from the vehicle electrical system.
2. purely regenerative braking of the drive axle with electric machine 16 being in generator mode and supplying electric power to the vehicle electrical system.
3. purely regenerative braking of the drive axle with electric machine 16 being in generator mode and supplying electric power to the vehicle electrical system and to battery 18.
4. combined electrical and mechanical braking of the drive axle. The power of electric machine 16 is not sufficient to provide the full desired deceleration torque for the vehicle. Electric machine 16 is in generator mode and supplies electric power to the vehicle electrical system and to battery 18. The mechanical brake provides the difference between the desired and the actual torque.
5. purely mechanical braking.

Brake module selector 38 activates operating modes as a function of signals 30 present at interface 28 with the aid of the decision matrix below (0=no, 1=yes):

| | $Bat_{rek}$ | $M_{Awlsoll} >$ $M_{Awlmax}$ | $ESP_{Flag}$ | $I_{Gen} > 0$ | $T_{coolant} <$ $T_{coolant\ desired}$ | $I_{Bat} < 0$ |
|---|---|---|---|---|---|---|
| mode 1 | 0, 1 | 0 | 0 | 1 | 1 | 0 |
| mode 2 | 0 | 0 | 0 | 0 | 0, 1 | 0 |
| mode 3 | 1 | 0 | 0 | 0 | 0, 1 | 1 |
| mode 4 | 1 | 1 | 0 | 0 | 0, 1 | 1 |
| mode 5 | in all other cases and if $FRek_{Flag} = 1$ | | | | | |

Regenerative braking according to one of the operating modes 1 through 4 is only permitted if, in a braking situation, no ESP intervention occurs, i.e., $ESP_{Flag}=0$, and if no malfunction occurs in the units that are active during regenerative braking, i.e., $FRek_{Flag}=0$. In operating mode 1, it is not possible to produce electric energy. Battery power must be used to provide the desired deceleration power. This mode is useful, for example, after a cold-start phase of hybrid drive 10 to bring the coolant of cooling circuit 20 to the optimum operating temperature.

When the coolant is at an appropriate temperature, regenerative braking takes place only if generator current $I_g$ is negative, i.e., electric machine 16 can actually supply electric power. As long as the regenerated power does not exceed the power requirements of the loads in the vehicle electrical system, i.e., $I_{Bat}>0$, regenerative braking can also take place without the battery being ready for charging ($Bat_{rek}=0$). In this case, operating mode 2 is selected.

If a charging current is detected at battery 18, the battery must be ready for charging ($Bat_{rek}=1$). In this case, operating mode 3 is activated. If this is not the case, the torque of electric machine 16 must be limited in such a manner that operating mode 2 is reached again.

If the deceleration power increases to values above the maximum regeneration torque curve $M_{output\ max}$ (which depends on vehicle speed v), the surplus torque $M_{output\ surplus}=M_{output\ desired}-M_{output\ max}$ must be provided by brake system 22. In this case, operating mode 4 is activated.

Unit control 42 specifies the control variables (signals 34; desired torque and desired speed) for electric machine 16. In the process, unit control 42 selects the control variables based on a characteristic map as a function of the desired torque $M_{output\ desired}$ and the vehicle speed v. In this connection, the control maps are designed in such a manner that generator current $I_g$ of electric machine 16 is maximum for a requested, desired torque $M_{output\ desired}$ and the current vehicle speed v.

Unit control 42 takes into account a characteristic curve of the maximum torque, the maximum regeneration torque curve following from the relationship $$M_{MaxReg}(v_{vehicle})=\min(M_{MaxGen}(v_{vehicle}), M_{maxCharge}(v_{vehicle})).$$

In this context, $M_{MaxGen}(v)$ represents the maximum torque curve of electric machine 16, and $M_{maxCharge}(v)$ represents the torques at which the maximum battery charging current $I_{Bat}$ can be produced. It is also possible to take into account a minimum torque limit curve $M_{MinReg}(v)$. This minimum torque limit curve separates the operating modes 2 and 3 from each other. This creates a boundary between the operating modes that allow active input of electric power into the vehicle electrical system and those placing an electric power demand on the vehicle electrical system.

The control maps and the maximum torque curve of unit control 42 can be determined and/or calculated in advance based on known parameters of hybrid drive 10, and stored in corresponding memory modules within regeneration strategy block 32.

In this connection, the control maps and the maximum torque curves must be determined and stored for each of the permissible speed ratios i of transmission 14 that are possible. The selection will then be made based on the actual speed ratio i of transmission 14, which can be influenced by shift logic 40.

Shift logic 40 can allow the regenerative efficiency of electric machine 16 to be improved by shifting gears when the electric machine is in generator mode and operatively connected to transmission 14.

The speed ratios that are optimal for regenerative braking operations, such as the desired gears, are stored in a shift map, which uses the desired output torque $M_{output\ desired}$ and the current vehicle speed v as parameters. These shift maps are also stored in memory modules of regeneration strategy block 32.

The shift map is determined with the aid of an optimization procedure for all operating points that can be obtained with several gears or several transmission stages. This can be done, for example, by calculating generator current $I_g$ for each permissible speed ratio using the control maps of unit control 42, and by then storing the speed ratio at which the maximum generator current $I_g$ can be achieved as the speed ratio of optimum efficiency.

If a shift program for driving is stored in the higher-level vehicle control system, then the current desired speed ratio of transmission 14 for regenerative braking must be balanced with desired speed ratio of transmission 14 for the drive event of steady-state driving at the current vehicle speed v. For example, provision can be made to allow a difference of only one gear step between the two desired speed ratios. This prevents the need for excessive gear shifting when changing from the braking operation to the drive operation of the vehicle.

If during regenerative braking the desired deceleration torque at the drive axle is below a presettable threshold value and/or a gradient of the desired deceleration torque is positive, i.e., pressure is removed from the brake pedal, then the system shifts to the desired speed ratio of transmission 14 for driving. The positive gradient of the deceleration torque indicates a request of the driver or an automatic driving system to propel the vehicle again.

The vehicle-specific parameter or strategy block 36 contains vehicle and driver-train specific information such as the desired coolant temperature $T_{coolant\ desired}$ or the maximum battery charging current $I_{Batmax}$. Further vehicle-specific decision criteria can also be kept available for the selection of the operating modes by brake module selector 38.

Figure 2:
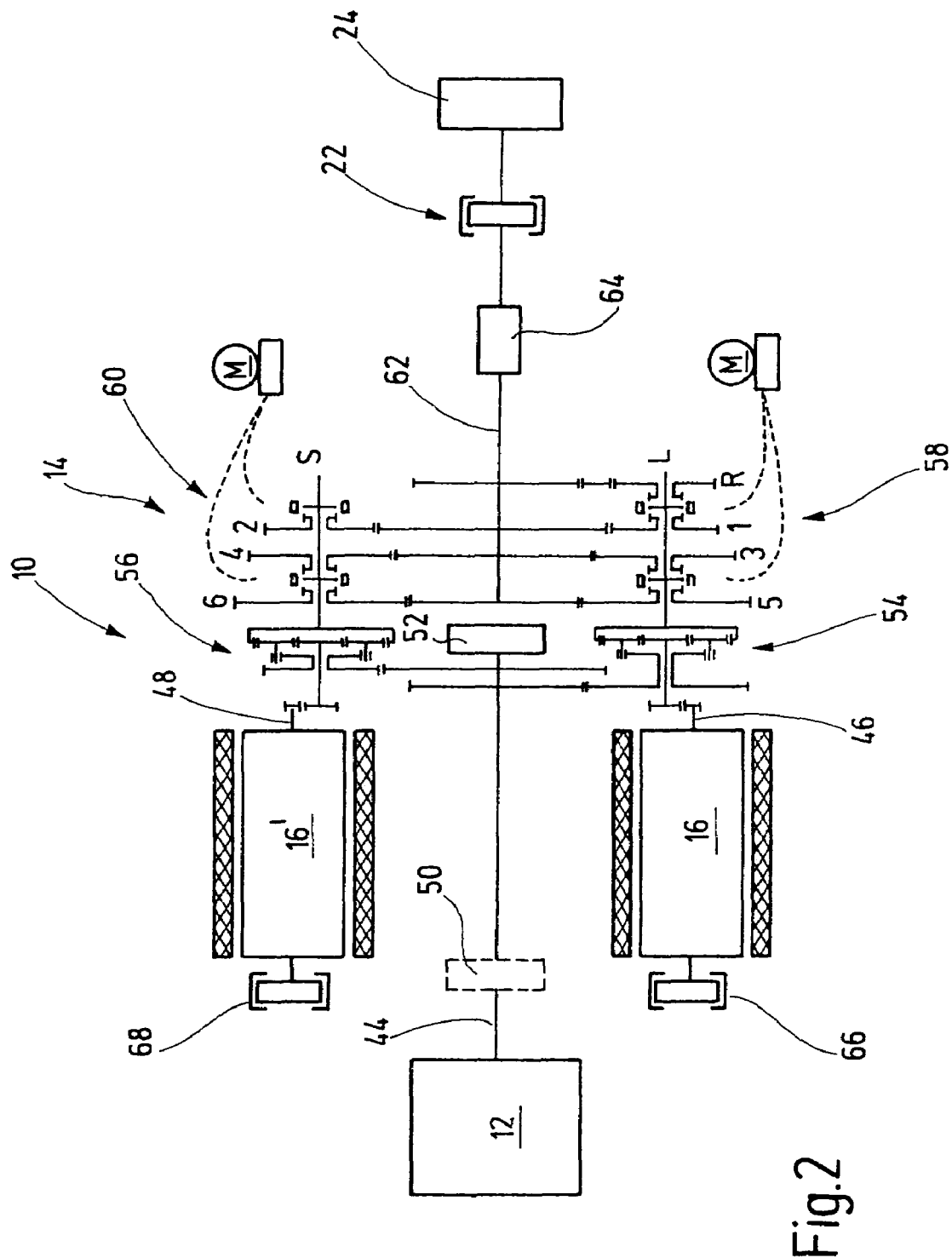
FIG. 2 shows a specific exemplary embodiment of a hybrid drive in a schematic view.

FIG. 2 shows a specific embodiment of a hybrid drive 10 in a schematic view, which will be used to illustrate the implementation of the brake-energy regeneration strategy. The hybrid drive 10 shown here is a so-called "power take-off dual E-drive". Hybrid drive 10 includes internal combustion engine 12, first electric machine 16, and second electric machine 16'. A crankshaft 44 of internal combustion engine 12 and drive shafts 46 and 48 of electric machines 16, 16' are operatively connected to transmission 14. Crankshaft 14 is also connected to a dual-mass flywheel 50 and to a one-way clutch 52.

Drive shaft 46 of electric machine 16 is connected to a first planetary gear set 54, and drive shaft 48 of electric machine 16' is connected to a second planetary gear set 56. A ring gear of planetary gear set 54 is connected to a manual transmission 58, and a ring gear of planetary gear set 56 is connected to a manual transmission 60. Manual transmissions 58 and 60 are, in turn, connected to drive shaft 62 of transmission system 14. Drive shaft 62 is connected to drive system 24 via a final drive assembly 64 and brake system 22.

The design and mode of operation of such a hybrid drive 10 are generally known, and therefore will not be discussed in detail in this specification. In particular, it is possible to request differing torques from the internal combustion engine 12 and/or electric machines 16, 16' onto drive shaft 62 by controlling the internal combustion engine and/or the electric machines in a selective manner. Thus, it is possible to select different operating modes of hybrid drive 10. Manual transmissions 58 and 60 allow engagement of different gears in known manner by operating a shifter, the gears being denoted here by 1, 2, 3, 4, 5 and 6 and a reverse gear R. Electric machines 16, 16' can each be operated in generator mode and are used, for example, to provide a system voltage of the motor vehicle and to charge automotive battery 18. Electric machines 16 are each associated with braking devices 66 and 68 which can be used to mechanically brake rotors of the electric machines 16.

Drive train 24 can be mechanically braked by brake system 22. In standard drives for vehicles, usually, the front axle is always braked mechanically so that only a deceleration torque component which is applied to the rear axle by electrical machine 16 in generator mode can be completely or partially supplied to the vehicle's electrical system.

With regard to the general relationships of the inventive brake energy regeneration which are described with reference to FIG. 1, the resulting modifications are as follows:

Interface 28 receives additional signals 30 that correspond to the instantaneous actual torques of electric machines 16 and 16'. The possible operating modes selected by brake module selector 38 also apply to this specific embodiment of hybrid drive 10.

Figure 4:
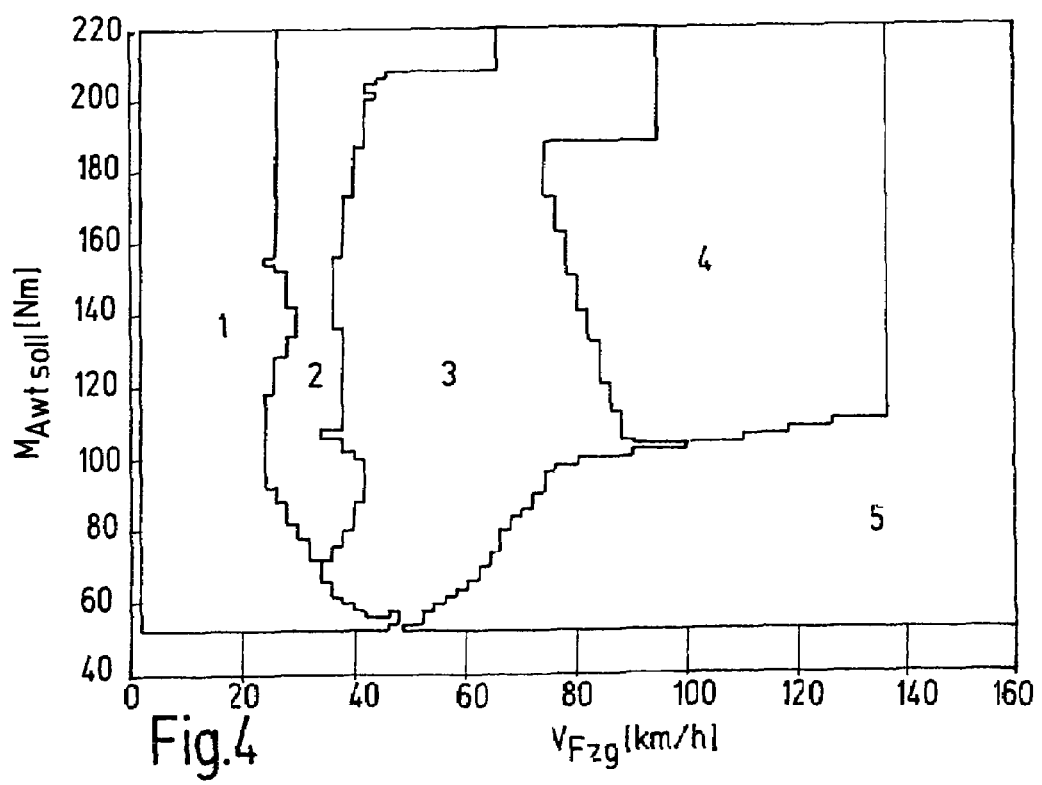
FIG. 4 shows a shift map of a transmission according to the exemplary embodiment in FIG. 2.

Shift logic 40 can influence the transmission stage of transmission 14. In the specific embodiment according to FIG. 2, a total of five gear stages are possible. FIG. 4 shows a shift map for transmission 14; numerals 2, 3 and 4 referring to the transmission stages that are suitable for regenerative braking with the corresponding operating points, which are dependent on the desired output torque $M_{output}$ and the vehicle speed v.

Figure 3:
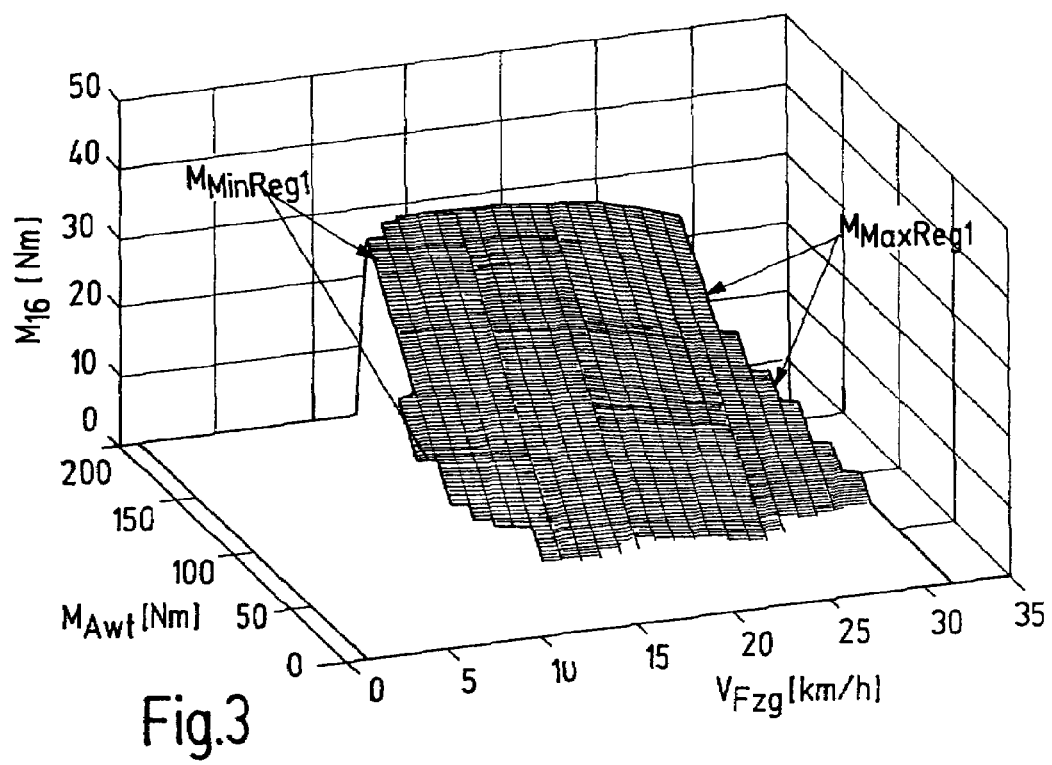
FIG. 3 shows a control map of an electric machine according to the exemplary embodiment in FIG. 2.

Unit control 42, which specifies the control variables for electric machine 16, works with the control map shown, for example, in FIG. 3. This control map of electric machine 16 refers to gear stage 2 of transmission 14. Plotted in the control map are the torque limit curves applying to the maximum torque $M_{MaxReg1}$ and minimum torque $M_{MinReg1}$. A desired torque $M_{16}$ is derived for electrical machine 16 from the control map as a function of the desired transmission output shaft torque $M_{output}$ and the vehicle speed v.

Since, according to the exemplary embodiment in FIG. 2, hybrid drive 10 has two electric machines 16, 16' (the plot in FIG. 3 refers only to the control map of one electric machine 16), absolute maximum torque limit curves and absolute minimum torque limit curves are produced as the sums of $M_{Max16}$ and $M_{Max16'}$ and $M_{Min16}$ and $M_{Min16'}$, respectively, above which the electrical machines 16 and 16' can actually input power to the vehicle electrical system.

In the regenerative braking event, the hybrid drive 10 according to FIG. 2 has a continuous and a discrete degree of freedom. The continuous degree of freedom is associated with the torque distribution to electrical machines 16 and 16'. The discrete degree of freedom is associated with the selection of the gear stage of transmission 14. The operating points for the regenerative braking event are determined by the selection of the desired torque $M_{16}$ of electric machine 16 via the control map according to FIG. 3 and a desired gear stage by shift logic 40 according to the shift map in FIG. 4.

The vehicle-specific strategy block 36 for the hybrid drive 10 according to the exemplary embodiment in FIG. 2 contains, for example, the value $T_{coolant}=90°$ C. as the optimum coolant temperature and the value $I_{Bat}=500$ A as the maximum battery current.

Moreover, the actual torques of electric machines 16, 16' are compared to the desired torques $M_{16}$, $M_{16'}$. If the actual torque is below the desired values, it is assumed that the torque of electric machines 16, 16' was automatically limited, for example, by the pulse-width controlled inverters controlling electric machines 16, 16'. This can happen when an overvoltage occurs in the vehicle electrical system. In this case, desired transmission output torque $M_{output}$ is replaced with the actual torque of electric machines 16, and this reduced actual torque is communicated to electronic control brake system 22 via motor controller 26. If the actual torque of electric machines 16 and 16' is above the setpoint inputs, or the actual torque the value 0, then an error is detected and the internal error flag $FRek_{Flag}$ is set to 1 so that operating modes 1 through 4 cannot be selected by regeneration strategy block 32.

What is claimed is:

1. A method for controlling a hybrid drive of a vehicle, the hybrid drive including an internal combustion engine and at least one electric machine as drive motors, and output shafts of the drive motors being operatively connectable to a drive train of the vehicle, the method comprising:
   in response to a negative torque demand on the drive train of the vehicle, controlling the at least one electric machine in generating an operating mode based on a control map;
   wherein the control map is bounded by limit curves which limit an operating range of a brake energy regeneration, a minimum limit curve defining a transition between a purely regenerative operation including active input of electric power into a vehicle electrical system and a purely regenerative operation including an electric power demand placed on the vehicle electrical system, and a maximum limit curve defining a transition between a purely regenerative operation including active input of electric power into the vehicle electrical system and a combined regenerative and mechanical operation, and
   wherein the maximum limit curve is a function of the vehicle speed, and at each speed has a value which is a lower of: (a) a maximum torque of the at least one electric machine and (b) a torque at which a maximum battery current can be produced.

2. The method as recited in claim 1, wherein the at least one electric machine is controlled as a function of a desired brake torque and a vehicle speed.

3. The method as recited in claim 1, wherein control is via a regeneration strategy block that receives required signals via an interface and that has function modules that generate control signals for the at least one electric machine.

4. The method as recited in claim 3, further comprising:
   causing a brake module selector to selectively activate different operating modes for braking as a function of the required signals present at the interface.

5. The method as recited in claim 1, wherein the available operating modes are purely regenerative braking, combined regenerative and mechanical braking, and purely mechanical braking.

6. The method as recited in claim 1, wherein a unit control specifies, as control signals, at least one of a desired torque and a desired speed for the at least one electric machine.

7. The method as recited in claim 6, further comprising:
   reading the control signals out from a control map.

8. The method as recited in claim 7, further comprising:
   taking into account a maximum generator current of the at least one electric machine as a parameter in the control signals.

9. The method as recited in claim 1, further comprising:
   causing a shift logic to select a transmission stage of a transmission that allows the at least one electric machine to achieve an optimum regenerative efficiency.

10. The method as recited in claim 9, wherein the shift logic uses shift maps.

11. The method as recited in claim 9, wherein the shift logic takes into account actual transmission stages specified by a higher-level vehicle control system, and, in the case of deviations of more than one transmission stage, corrects the transmission stages for regenerative braking.

12. The method as recited in claim 9, wherein the shift logic takes into account a gradient of a desired deceleration torque.

13. The method as recited in claim 1, further comprising:
   at least one of calculating and determining at least one of the control map and a shift map based on specific actual parameters of a hybrid drive.

14. The method as recited in claim 1, further comprising:
   storing the control map and a shift map in the vehicle in a control unit that can be accessed by a regeneration strategy block.

* * * * *